(12) United States Patent
Kannankeril et al.

(10) Patent No.: US 6,800,162 B2
(45) Date of Patent: Oct. 5, 2004

(54) INTEGRATED PROCESS FOR MAKING INFLATABLE ARTICLE

(75) Inventors: Charles Kannankeril, North Caldwell, NJ (US); Mike Metta, Wayne, NJ (US); Bob O'Dowd, Wesley Hills, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 28 days.

(21) Appl. No.: 09/934,732

(22) Filed: Aug. 22, 2001

(65) Prior Publication Data

US 2003/0037858 A1 Feb. 27, 2003

(51) Int. Cl.$^7$ .............................................. A63B 41/00
(52) U.S. Cl. .................. 156/145; 156/209; 156/244.13; 156/244.23; 156/290; 156/292; 156/308.4
(58) Field of Search .............................. 156/308.4, 145, 156/146, 147, 209, 244.11, 244.13, 244.14, 244.21, 244.23, 290, 292, 470, 471; 428/166, 178

(56) References Cited

U.S. PATENT DOCUMENTS

| | | | | |
|---|---|---|---|---|
| 3,142,599 A | * | 7/1964 | Chavannes | 156/210 |
| 3,346,438 A | * | 10/1967 | Chavannes | 156/210 |
| 3,660,189 A | | 5/1972 | Troy | 156/145 |
| 3,703,430 A | * | 11/1972 | Rich | 156/497 |
| 3,954,368 A | * | 5/1976 | Kawakami | 425/326.1 |
| 4,096,306 A | * | 6/1978 | Larson | 428/192 |
| 4,169,002 A | * | 9/1979 | Larson | 156/145 |
| 4,231,832 A | | 11/1980 | Weikert | 156/244.14 |
| 4,576,669 A | * | 3/1986 | Caputo | 156/145 |
| 4,657,625 A | | 4/1987 | Kawakami | 156/471 |
| 5,116,444 A | * | 5/1992 | Fox | 156/244.17 |
| 5,188,691 A | * | 2/1993 | Caputo | 156/145 |
| 5,196,254 A | * | 3/1993 | Akiyama | 428/178 |
| 5,665,456 A | * | 9/1997 | Kannankeril et al. | 428/178 |
| 5,824,392 A | * | 10/1998 | Gotoh et al. | 428/178 |
| 5,837,335 A | | 11/1998 | Babrowicz | 428/34.9 |
| 6,410,119 B1 | * | 6/2002 | De Luca et al. | 428/166 |

FOREIGN PATENT DOCUMENTS

| | | | | |
|---|---|---|---|---|
| EP | 415730 A | * | 3/1991 | ........... B29C/51/10 |
| GB | 978654 | | 12/1964 | |
| GB | 1087901 | | 10/1967 | |

* cited by examiner

Primary Examiner—Blaine Copenheaver
Assistant Examiner—John L. Goff
(74) Attorney, Agent, or Firm—Rupert B. Hurley, Jr.

(57) ABSTRACT

An integrated process for making an inflatable laminated article comprises extruding a first film and a second film, followed by cooling the first film and the second film so that the films will not fuse to one another upon contact with each other. The films are then brought into contact with one another, and selected portions of one or both films are heated so that the films are heat sealed to one another in a selected area having a desired pattern. The unsealed area between the film provides inflatable chambers between the first film and the second film. An alternative process utilizes a film tubing in lay-flat configuration to produce a laminated inflatable article.

28 Claims, 12 Drawing Sheets

INTEGRATED PROCESS FOR MAKING INFLATABLE ARTICLE

FIELD OF THE INVENTION

The present invention relates generally to methods of making laminated film articles, apparatus for making laminated film articles, and more particularly, to apparatus and methods for making laminated film articles having inflatable chambers and channels.

BACKGROUND OF THE INVENTION

Conventional cushion materials include thermoformed sealed laminate articles such as Bubble Wrap® cushioning material. However, it is also known to prepare laminated inflatable articles which can be shipped to a packer uninflated, and inflated immediately before use. Such inflatable articles are typically made from two heat sealable films which are fused together in discrete areas to form one or more inflatable chambers.

Conventional methods of making cushion material, such as Bubble Wrap® cushioning material, use a vacuum source to deform polymer film to form bubbles or pockets that can be filled with air (or other gases) to form bubbles. Such products can be made using a heated drum having recesses that are connected to a vacuum source. When vacuum is applied, each of various regions of the heated film in contact with the drum is drawn into a recesses on the drum. The heated film is deformed and thinned in the regions drawn into the recess by the vacuum process. One side of the resulting film remains "flat", while the other side is not flat, but rather is "thermoformed". A second film, which preferably is a flat film, i.e., not thermoformed, is fused to the "flat side" of the formed film, resulting in a plurality of sealed, air-filled "bubbles."

Conventional cushion fabricating processes also include a first stage film fabrication step and a separate second stage fusing step. In the first stage, polymer films are fabricated by conventional techniques known to those in the art of polymer film fabrication. In the second stage, the polymer films are combined according to heat sealing methods that are known to those in the art of polymer film sealing techniques.

Two-stage manufacturing processes are undesirable because of the added cost and inefficiency associated with the process. During two stage processes, films are fabricated and wound onto rolls at one location, and unwound and combined with a second film to make a cushioning material at a second location. The processes are inefficient in that they include winding and unwinding of rolls of film, together with inventorying and transporting, as well as other inefficiencies associated with two-stage processes.

SUMMARY OF THE INVENTION

The present invention overcomes the inefficiencies and other detriments described above with an integrated, one-stage process for making an inflatable laminated inflatable article. The process of the invention uses a single stage to go from polymer extrusion to form the film or films, thereafter sealing the film or films together to form inflatable chambers between the films.

As a first aspect, the present invention is directed to an integrated process for making an inflatable laminated article, comprising the steps of: (A) extruding a first film and a second film; (B) cooling the first film and the second film so that the films will not fuse to one another upon contact with each other; (C) contacting the first film with the second film; (D) heating selected portions of at least one of the first and second films to a temperature above a fusion temperature, so that the first and second films are heat sealed to one another at a selected area, with the selected area providing a heat seal pattern in which the unsealed portions between the films provide inflatable chambers between the first film and the second film. Of course, if one or more of the films are multilayer films having a sealing layer, the heating of such film need only be to a temperature above the fusion temperature of at least the seal layer of one or more of the films.

While it is preferred to have the C and D steps in this order, they may be reversed in order, i.e., by first heating selected portions of at least one of the films followed by contacting the first film with the second film so that the first and second films are heat sealed to one another at selected areas. Moreover, the selected areas need not correspond exactly with the selected portions which are heated. That is, the portions which are heat sealed may be slightly larger or slightly smaller than the selected portions which are heated.

While the cooling can be active (e.g., contacting one or more films with one or more chilled rolls, belts, the use of cool air or water, etc.), it can also be passive, e.g., simply providing the first and second films enough time to cool under ambient conditions so that they do not fuse to one another upon contact. Thereafter, in order to heat seal the films to one another, it is necessary to heat at least the seal layers of one or both of the films to a temperature at or above a temperature at which the one or more of the seal layers will fuse.

Preferably, the first and second films are extruded simultaneously. Although it is possible to extrude both films from the same extruder (followed by separation from one another), preferably the first and second films are extruded using separate extruders. Either or both the first and second films can be extruded using an annular die or a slot die, i.e., as an annular film or as a flat film, respectively. If an annular die is used, the resulting lay-flat tubing can either be self-welded into a flat film, or converted to a flat film by being slit in the machine direction.

Preferably, the contacting of the first film with the second film is carried out by forwarding the first film and second film together at the same speed. Although heating of selected portions of one or more of the films can be carried out before the films contact one another, preferably the heating of the selected portions of the first and second films is carried out while the first and second films are in contact with one another, with the heat sealing being carried out using a combination of heat and pressure. In one embodiment, the contacting step and the heating step are performed simultaneously, with pressure being simultaneous with the heating, resulting in contacting and heat sealing being essentially simultaneous. During sealing, preferably heat and pressure are applied simultaneously.

Preferably, heating is performed by passing the first and second films together through a nip between a first roll and a second roll, with at least one of the rolls having a patterned raised surface and at least one of the pair of rolls being heated. Preferably the patterned roll is heated. However, both the first roll as well as the second roll can be provided with a raised surface, with the raised surfaces being operatively aligned to heat seal the selected portions of the first film and the second film. Preferably, each roll with a raised surface has a continuous raised surface so that the nip between the first and second rolls is maintained throughout rotation of the first and second rolls, without further means to maintain the nip. If a roll does not have a raised surface, preferably such roll has a smooth continuous surface to ensure that the nip is maintained throughout rotation of the roll. Alternatively, means can be provided to maintain the nip between irregular rolls, such as a resilient surface on one or more of the rolls, and/or a roll on a moveable axis with force continuously urging the rolls into contact with one another despite irregularities. Preferably, the first and second films are heat sealed to one another in a repeating pattern of sealed and unsealed areas.

As a second aspect, the present invention is directed to an integrated process for making an inflatable laminated article, comprising the steps of: (A) extruding a tubular film having an outside surface and en inside surface; (B) cooling the tubular film to a temperature low enough that the inside surface of the tubular film is cool enough not to adhere to itself; (C) placing the tubular film into the lay-flat configuration having a first lay-flat side and a second lay-flat side, so that a first inside lay-flat surface of the first lay-flat side of the tubular film is in contact with a second inside lay-flat surface of the second lay-flat side of the tubular film; and, (D) heating sealing selected portions of the first lay-flat side of the tubular film to the second lay-flat side of the tubular film, the heat sealing being carried out to provide a pattern of sealed and unsealed areas with the unsealed areas providing inflatable chambers between the first lay-flat side of the tubular film and the second lay-flat side of the tubular film. Depending upon the pattern of the heat sealing, the resulting heat sealed (i.e., laminated) article may or may not have to be slit along one or both side edges (i.e., slit in the machine direction) in order to provide access for means for inflating the inflatable chambers. The second aspect of the present invention is preferably otherwise carried out in accordance with preferred features set forth above in the first aspect of the present invention.

As a third aspect, the present invention is directed to an integrated process for making an inflatable laminated article, comprising the steps of: (A) extruding a flat film having a first outer surface and a second outer surface; (B) cooling the film so that the first outer surface is cool enough not to adhere to itself upon being doubled back against itself; (C) folding the film to make a crease in a machine direction of the film, with a first leaf of the film being on a first side of the crease and a second leaf of the film being on a second side of the crease, the first leaf being flat against the second leaf so that the first outer surface is doubled back against itself; and (D) heating sealing selected portions of the first leaf to the second leaf, the heat sealing being carried out to provide a pattern of sealed and unsealed areas with the unsealed areas providing inflatable chambers between the first leaf and the second leaf. The third aspect of the present invention is also preferably carried out in accordance with preferred features set forth above in the first aspect of the present invention.

BRIEF DESCRIPTION OF THE DRAWINGS

The numerous features and advantages of the present invention are better understood by those skilled in the art by reference to the accompanying detailed description and the following drawing, in which.

DETAILED DESCRIPTION

Methods of making protective polymeric laminates, the laminates themselves, and apparatus for making the protective laminates are disclosed. Protective laminates are made from two films, or from tubular stocks of film, in a one stage integrated in-line process. The laminates are composed of discrete films sealed to each other in selected seal regions, forming a pattern of sealed and unsealed portions, the latter of which define chambers, inflation channels, connecting passageways, an inflation skirt, and optionally one or more inflation manifolds that can be inflated, thereby ultimately (i.e., upon inflation and sealing to entrap the inflation gas or fluid) providing cushioning pockets or bubbles within the laminate. The present methods fabricate laminate materials from polymeric resins in a one stage process that eliminates disadvantages associated with multiple stage processes.

Figure 1:
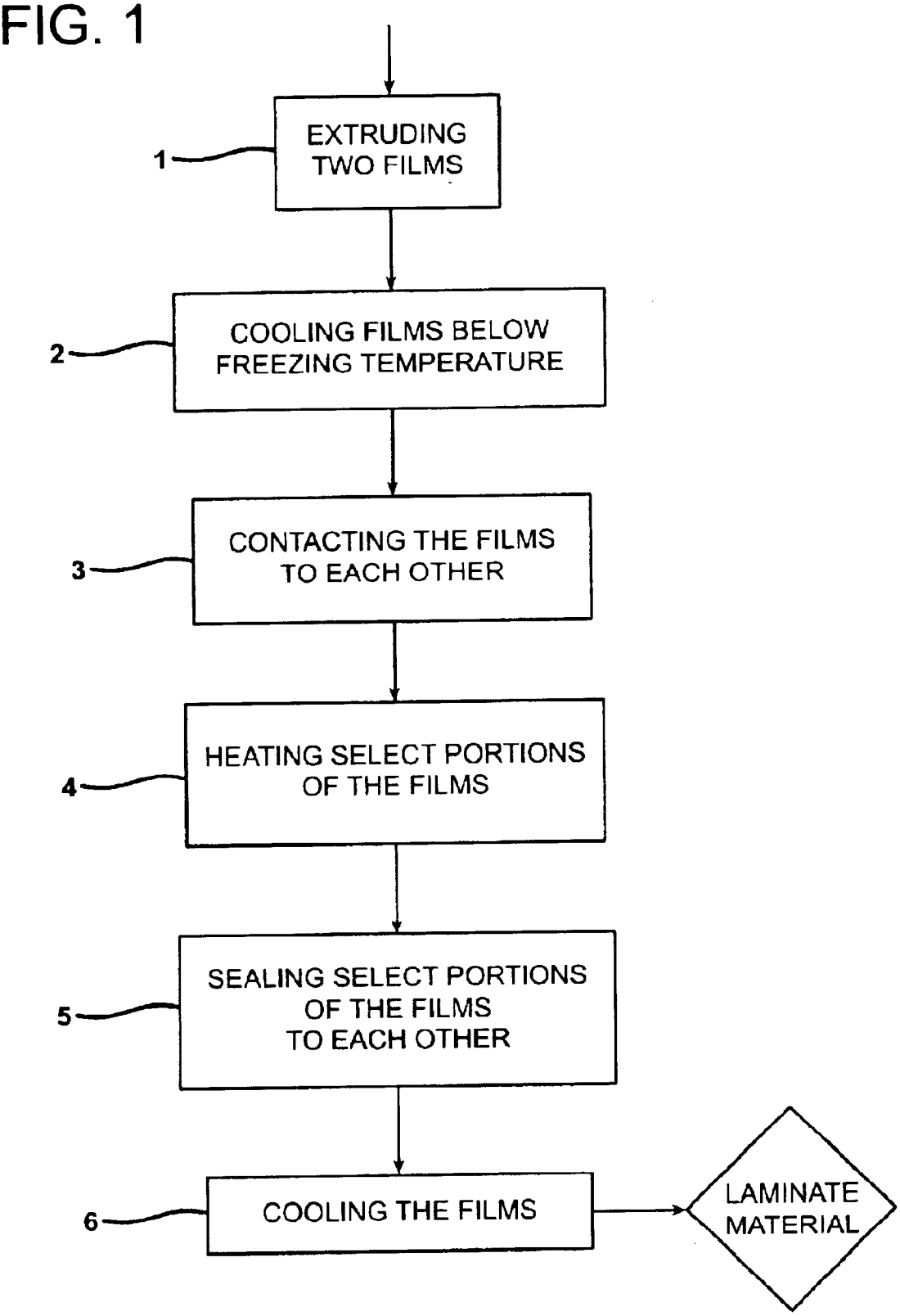
FIG. 1 is a flow chart illustrating aspects of one stage integrated methods of making laminate materials.

FIG. 1 is a flow chart illustrating various steps of the one-stage integrated method of making inflatable laminated articles in accordance with the first aspect of the present invention. Reference numerals 1 through 6 are employed to indicate the steps. The method of making the inflatable laminated article is carried out by extruding two films 1; cooling the films to a temperature below the fusing temperature of each of the films 2; contacting the first and second films to each other 3, heating selected portions of the films 4, sealing the select heated portions of the first film to the second film 5, and cooling the films to form the laminate material 6.

Although cooling step 6 can be passive (e.g., in that the heat seals are simply allowed to cool by giving offbeat to the ambient environment), it is preferably active in order to quickly cool the heat seals immediately after formation, so that the heat seal is not damaged or weakened by continued processing.

Figure 2:
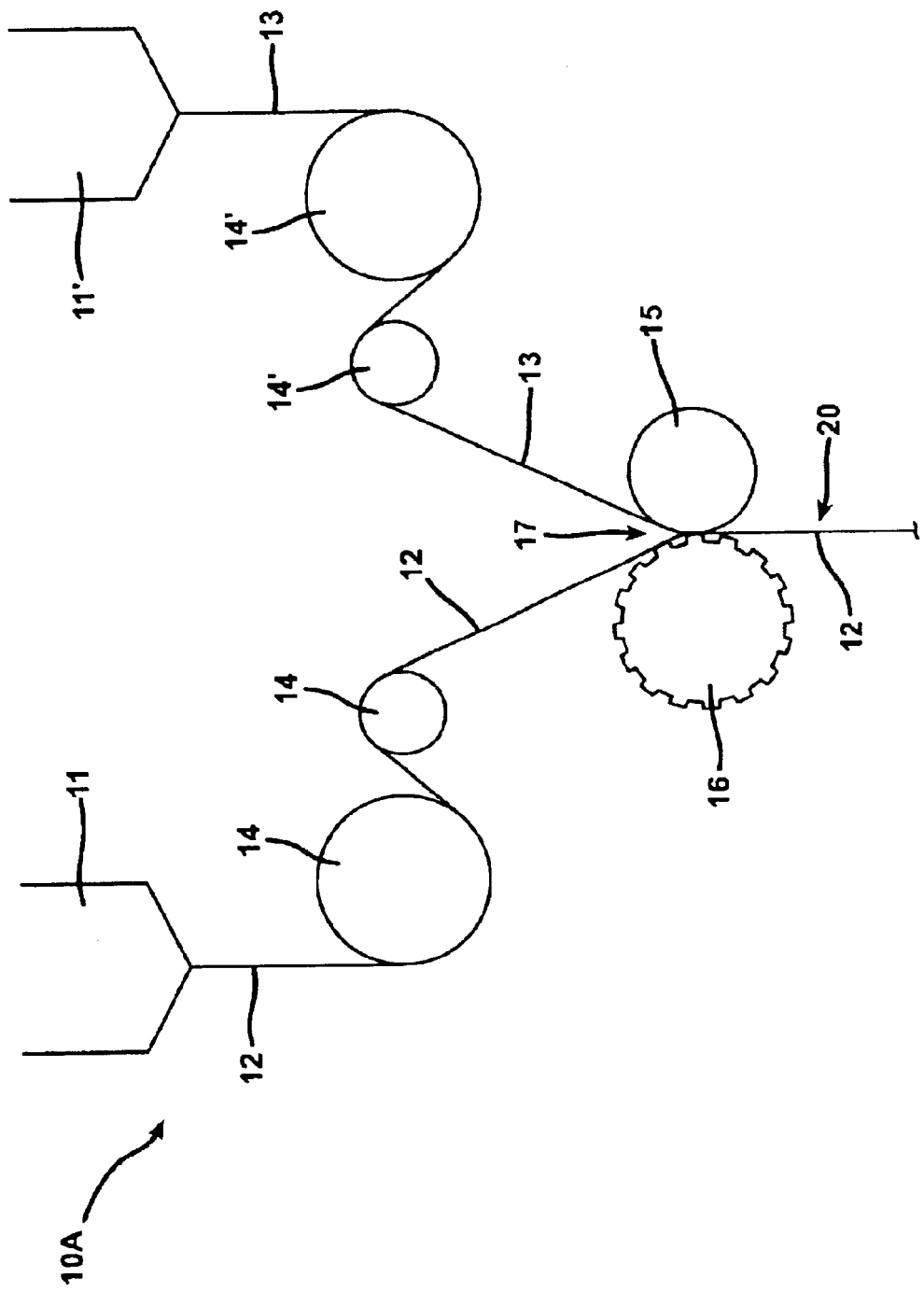
FIG. 2 is a diagrammatic view of one embodiment of an exemplary laminate manufacturing system.

FIG. 2 is a diagrammatic view of one embodiment of an exemplary laminate manufacturing system 10a. Referring to FIG. 2 to illustrate methods of the present invention, the laminate manufacturing system 10a comprises extruders 11 and 11', first and second films 12 and 13, transfer roller pairs 14 and 14', contact roller 15, and raised surface roller 16. First and second films 12 and 13 are extruded from separate extruders 11 and 11', respectively. After exiting extruders 11 and 11', first and second films 12 and 13 are cooled to a temperature just below the fusing temperature of layers 12 and 13. Films 12 and 13 can be actively cooled by one or more of transfer rollers 14 or by exposure to ambient conditions. Transfer roller pairs 14 and 14' guide first and second films 12 and 13 to nip 17 formed between contact roller 15 and raised surface roller 16. As films 12 and 13 pass through nip 17, pressure is applied to selected areas of both of films 12 and 13 while simultaneously heat is applied to at least one of films 12 and 13 through at least one of rollers 15 and 16, so that heated portions of films 12 and 13 are heat sealed to form heat seals in the sealed area, and inflatable chambers, passageways, etc in the unsealed area.

The present invention is inclusive of the heat sealing of two monolayer films to one another, heat sealing a multilayer film to a monolayer film, and heat sealing two multilayer films to one another.

Figure 3:
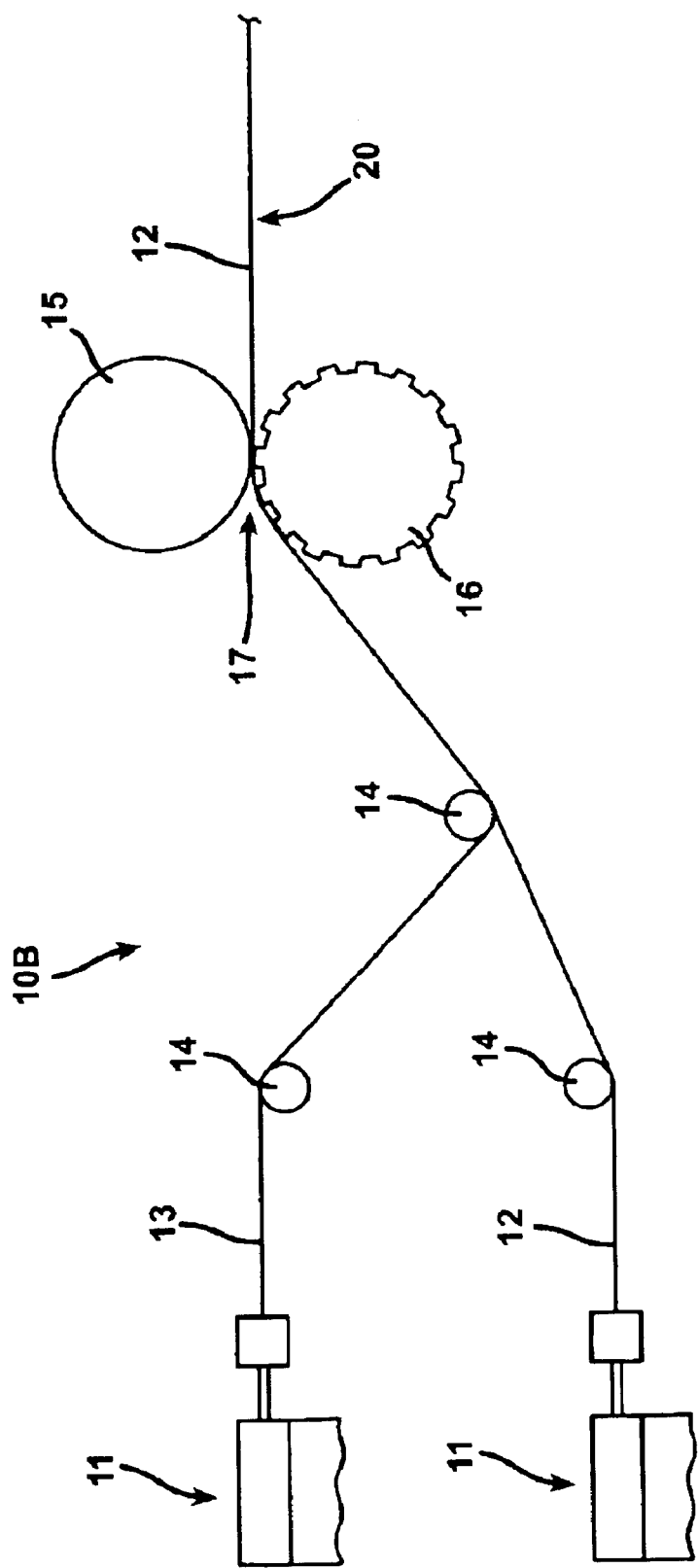
FIG. 3 is a diagrammatic view of another embodiment of an exemplary laminate manufacturing system.

FIG. 3 is a diagrammatic view of another embodiment of an exemplary laminate manufacturing system 10b. First and second films 12 and 13 contact one another before first film 12 contacts raised surface roller 16. Raised surface roller 16 heats selected portions of first film 12 and simultaneously heats selected portions of second film 13 that correspond to the heated portions of first film 12.

Figure 4:
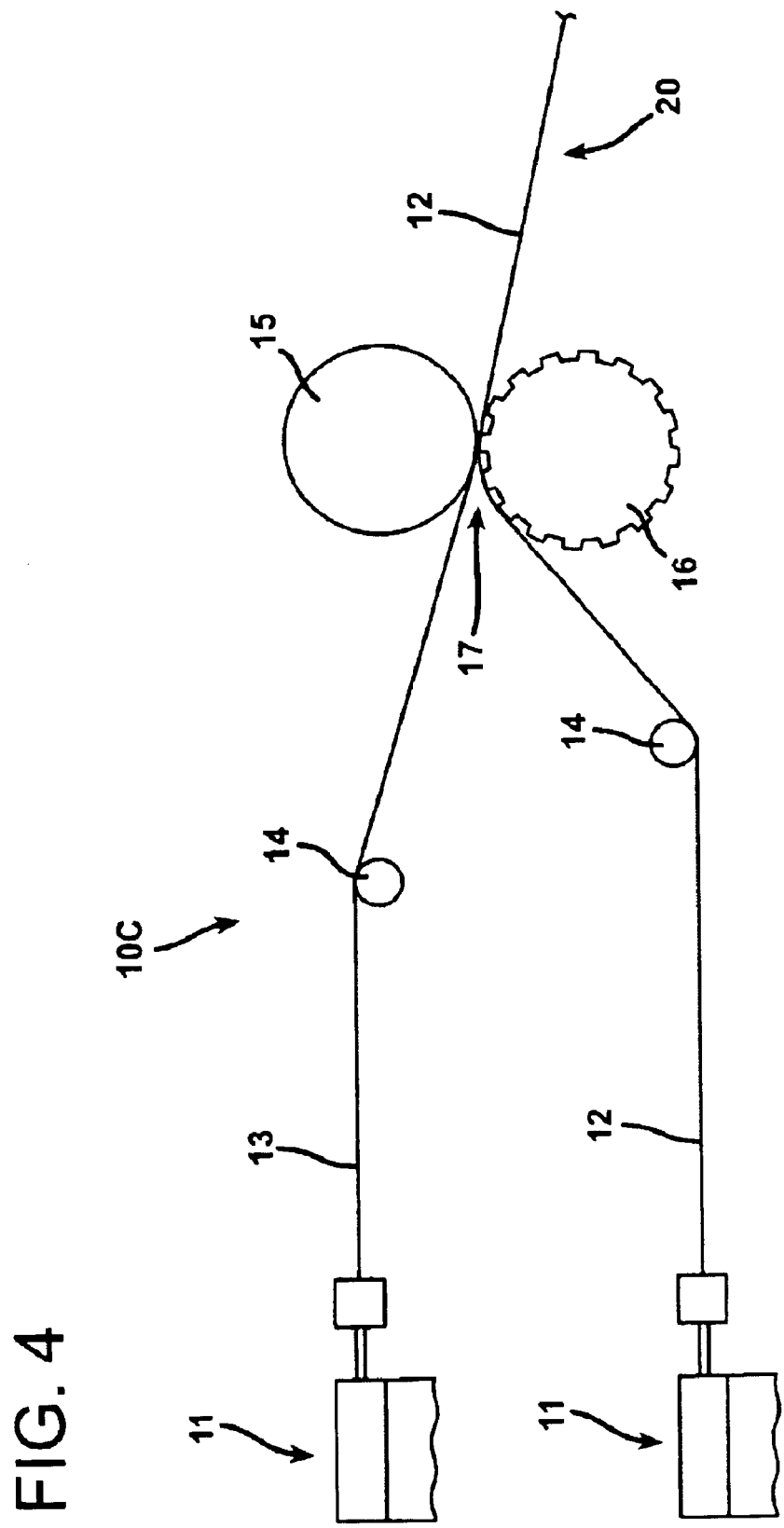
FIG. 4 is a diagrammatic view of another embodiment of an exemplary laminate manufacturing system.

FIG. 4 is a diagrammatic view of an embodiment of alternative laminate manufacturing process 10c. In FIG. 4, first film 12 contacts raised surface roller 16 before first film 12 contacts second film 13. Selected portions of first film 12 are heated by raised surface roller 16 before first film 12 contacts second film 13, by advancing first film 12 partially around raised surface roller 16 before passing films 12 and 13 through nip 17.

Figure 5:
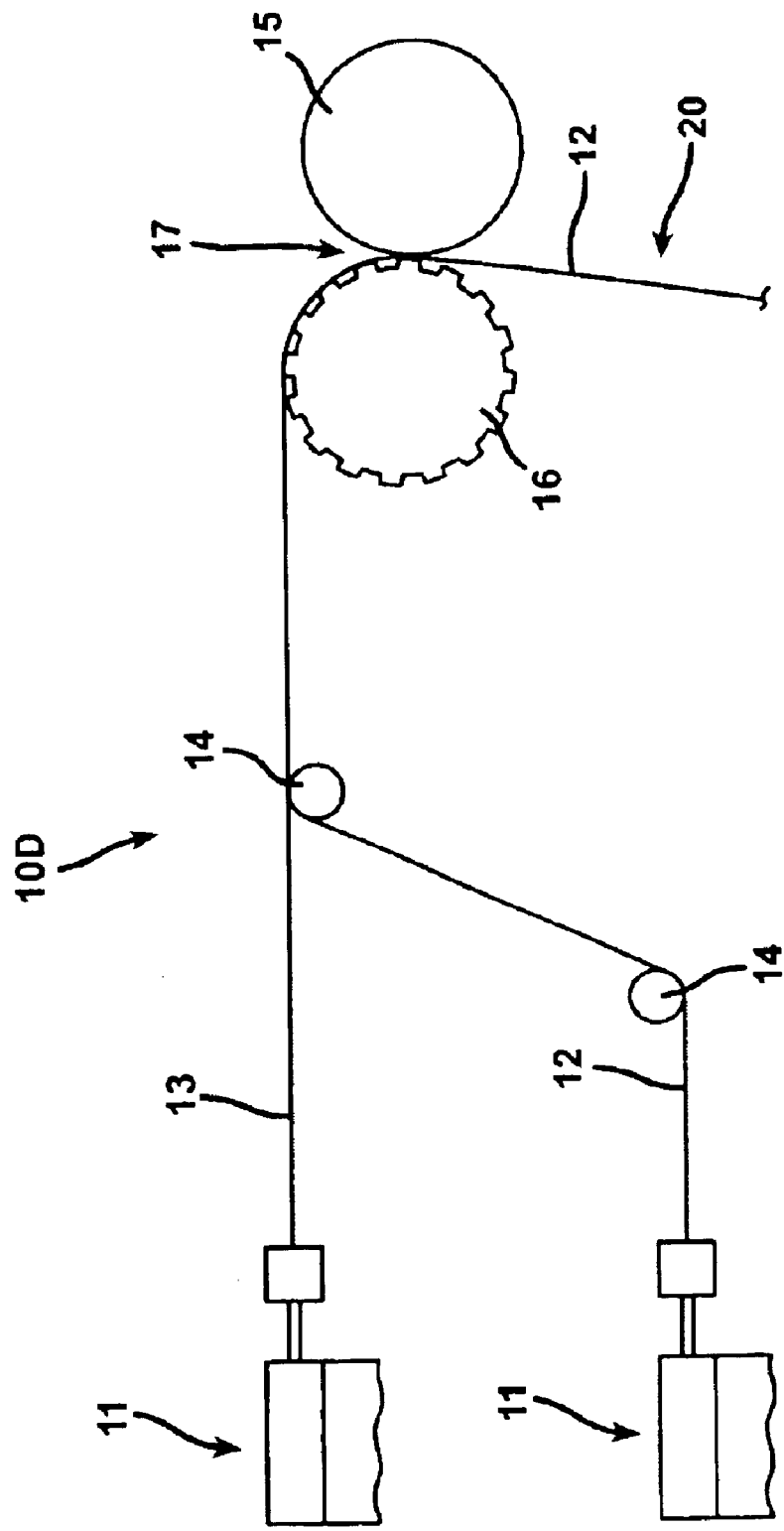
FIG. 5 is a diagrammatic view of another embodiment of an exemplary laminate manufacturing system.

FIG. 5 is a diagrammatic view of another alternative process 10d for making an inflatable article. In FIG. 5, first and second films 12 and 13 are in mutual contact when first film 12 contacts raised surface roller 16 before the films enter nip 17. First film 12 and second film 13 are heated by raised surface roller 16 as they are advanced through nip 17 between raised surface roller 16 and associated smooth nip roller 15.

Figure 6:
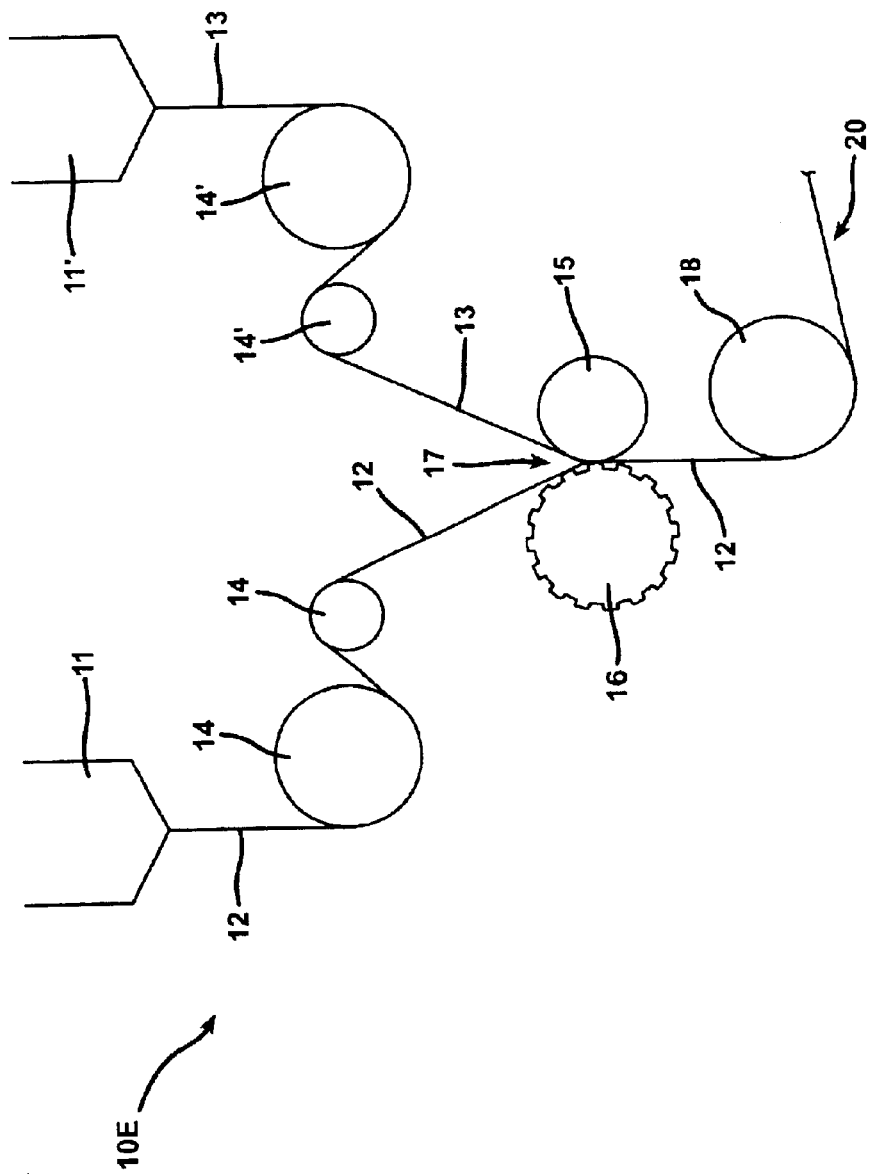
FIG. 6 is a diagrammatic view of another embodiment of an exemplary laminate manufacturing system.

FIG. 6 is a diagrammatic view of another alternative process 10e for making an inflatable article. In FIG. 6, the process further utilizes cooling roller 18 to cool the heat sealed laminate 20 shortly after sealing. First and second films 12 and 13 pass between nip 17 where selected portions of films 12 and 13 are heat sealed. The heated portions of films 12 and 13 are cooled, by cooling roller 18, to a temperature below the fusing temperature of films 12 and 13. In another embodiment (not illustrated), cooling roller 18 forms a nip with raised surface roller 16.

The one-stage process of the present invention eliminates the need to wind-up component films 12 and 13 after extrusion but before lamination, as well as the need for transporting and unwinding such intermediate products. The integrated process involves controlling the temperature of the component films during fabrication, thereby providing films that are not stressed during fabrication as in conventional two-stage processes. Preferably, the films are maintained at a temperature close to the fusing temperature of films, to minimize the stresses placed on the films. Minimizing temperature fluctuations yields laminate materials that are stronger and more durable than conventional packaging materials. The laminate materials made by the present methods are not inflated, which permits shipping an intermediate product of relatively high density but which is ready for inflation at the location of the end-use, and this is more efficient than shipping a low density inflated product.

The methods and apparatus of the present invention can be operated at a higher output than conventional processes, including for example film outputs of more than 250 feet in length of film per minute. In addition, the methods produce larger width films than conventional processes, including for example, widths greater than 36 inches. The increase in film width and in rate of film produced thereby permits an increase in the surface area of laminated material produced more efficiently and at lower cost compared to conventional methods.

Figure 7:
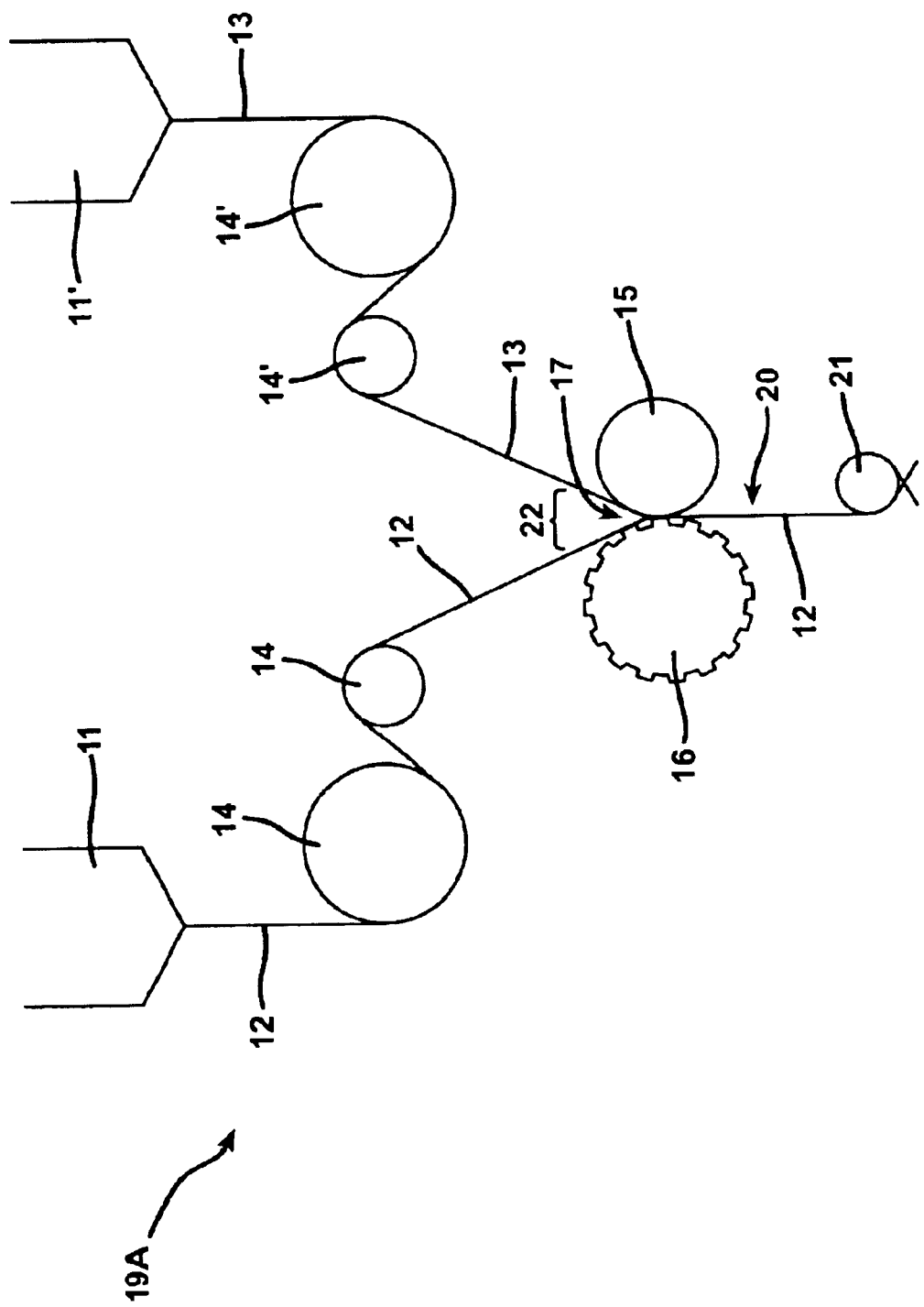
FIG. 7 is diagrammatic view of exemplary laminate manufacturing apparatus.
Figure 8:
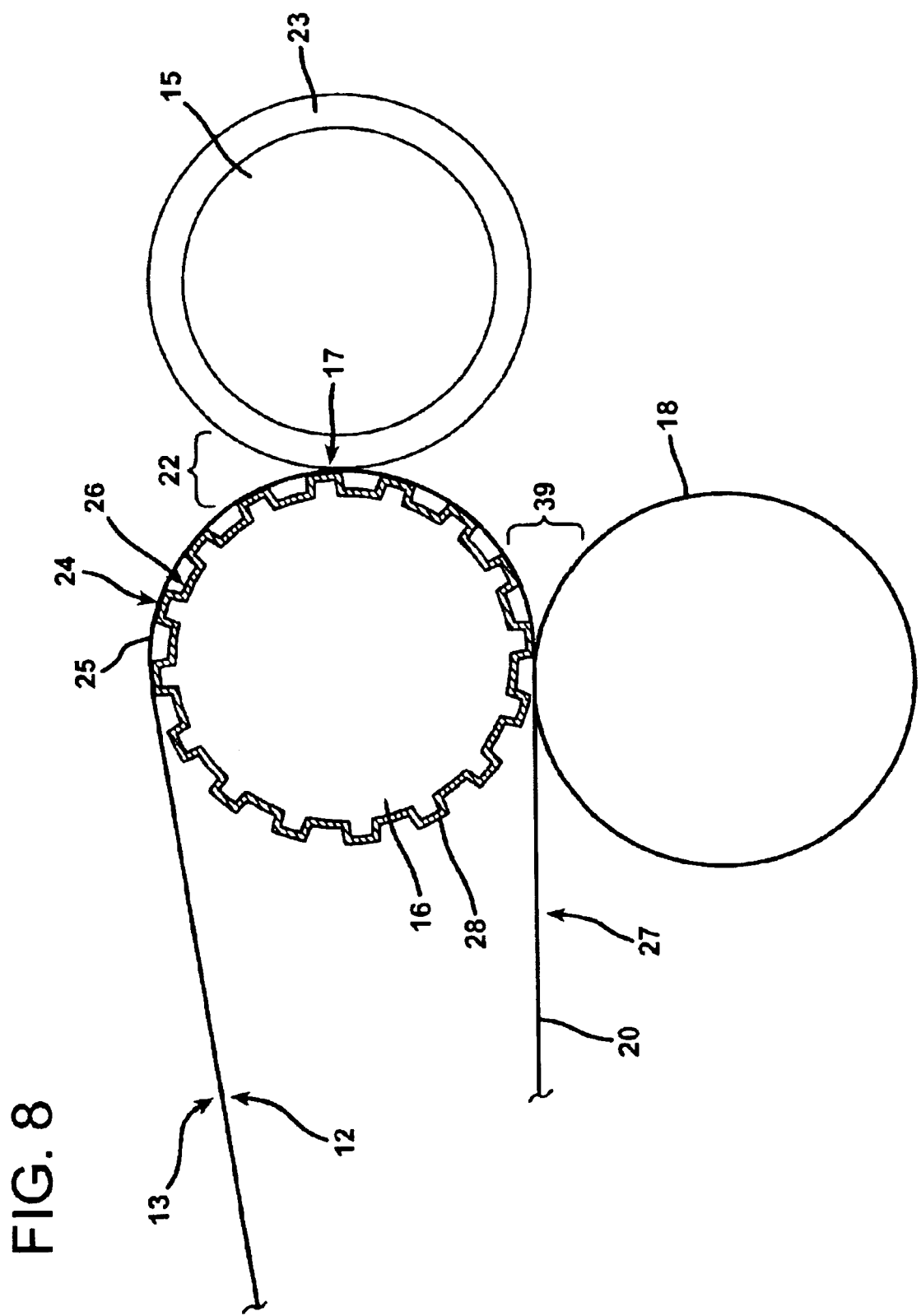
FIG. 8 is a diagrammatic view of a portion of the manufacturing process.

FIG. 7 is diagrammatic view of an alternative laminate manufacturing apparatus 19a. FIG. 8 is an diagrammatic view of an alternative arrangement nip 17. The methods described herein are performed by an apparatus capable of adjusting the temperature of films to maximize film fabrication speeds. Referring to FIG. 7 and FIG. 8, apparatus 19a for making laminate material 20 comprises extruder 11, transfer roller pairs 14 and 14', contact roller 15, raised surface roller 16, and collection roller 21. Contact roller 15 and raised surface roller 16 are operatively associated to form nip 17 which defines sealing zone 22.

Figure 9:
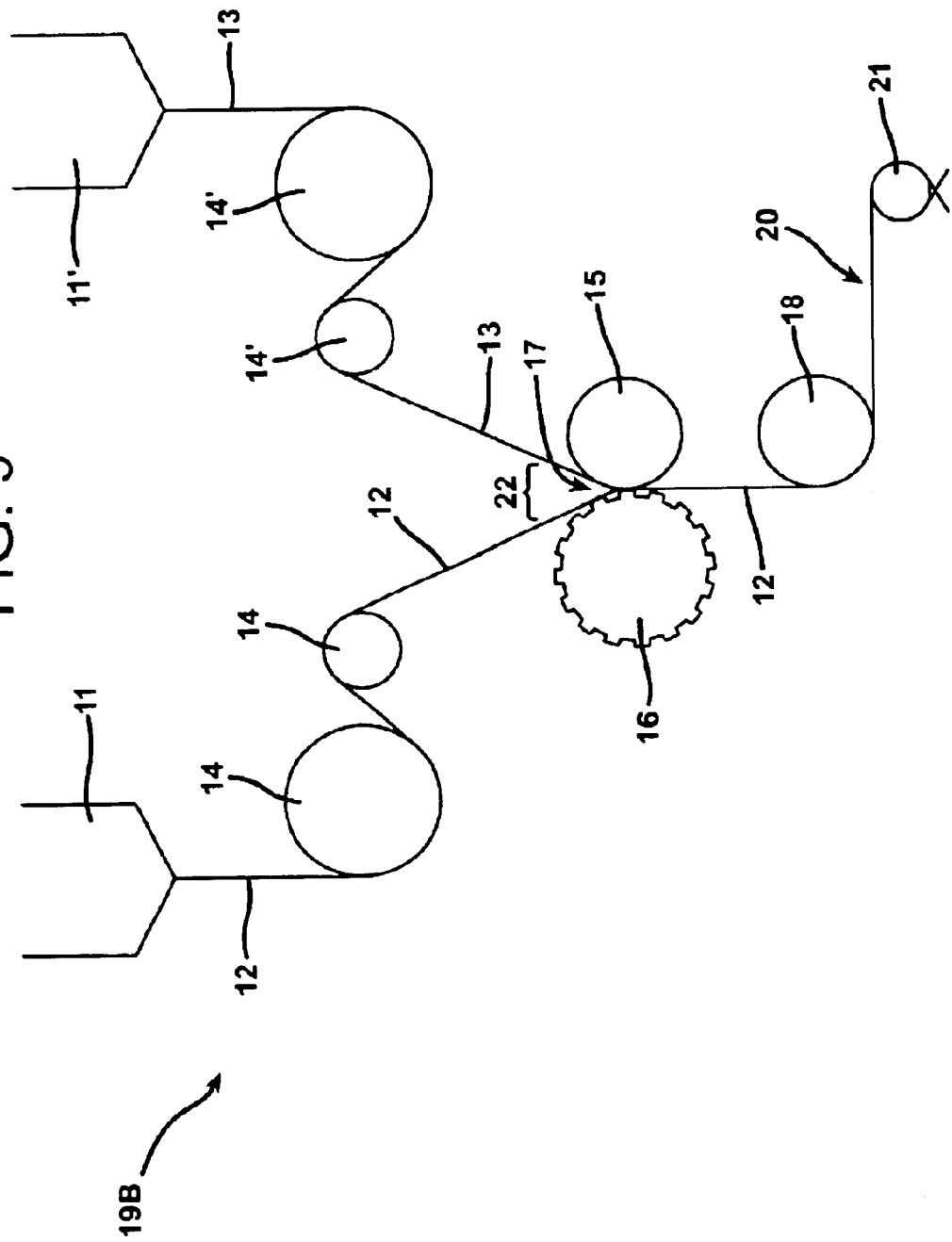
FIG. 9 is a diagrammatic view of another embodiment of a laminate manufacturing apparatus.

FIG. 9 is a diagrammatic view of another embodiment of a laminate manufacturing apparatus 19b. Referring to FIG. 9, apparatus 19b comprises extruders 11 and 11', transfer roller pairs 14 and 14', contact roller 15, raised surface roller 16, cooling roller 18, and collection roller 21.

Referring to FIG. 7, FIG. 8, and FIG. 9, transfer roller pairs 14 and 14' are conventional rollers familiar to persons skilled in the art of polymer film fabrication. With reference in particular to FIG. 7, the present invention is not limited to one transfer roller 14 or 14', but rather encompasses one or more rollers that guide films 12 and 13 to nip 17 as will be understood by persons familiar with film processing technology.

In one embodiment films 12 and 13 are cooled by transfer roller pairs 14 and 14', the cooling being to a temperature below the fusing temperature of each of films 12 and 13. Transfer roller pairs 14 and 14' are heat transfer rolls, cooled by conventional methods, such as cold water circulated through the rolls. In embodiments of the present invention having more than one transfer roller, it is preferred that transfer roller pairs 14 and 14' immediately prior to nip 17 cool films 12 and 13 to a temperature below the fusing temperature of each of films 12 and 13.

Referring to FIG. 7, FIG. 8, and FIG. 9, contact roller 15 opposes raised surface roller 16 and is operatively associated with raised surface roller 16 to form nip 17. Contact roller 15 applies pressure to films 12 and 13 as the films pass through nip 17. The present invention is not limited to contact roller 15, but rather encompasses other contact surfaces formed on other apparatus, such as a planer surfaces, curved surfaces, or portion of a clamp, as will be understood by persons familiar with film processing technology in view of the present disclosure.

With reference in particular to FIG. 8, contact roller 15 preferably has an elastic outer layer 23. More preferably, the elastic outer layer 23 is a smooth rubber layer. The elastic outer layer 23 is deformable and readily conducts heat. The rubber outer layer 23 provides heat transfer to the second layer 13 and diminishes the tendency of adherence of the second layer of film 13 to contact roller 15.

With reference in particular to FIG. 8, raised surface roller 16 comprises raised surfaces 24, recesses 25, and recessed surfaces 26. Raised surface roller 16 is a heat transfer roller and is heated by conventional heating apparatus, as will be understood by persons familiar with plastic film and roller heating technology. Preferably raised surface roller 16 is heated by hot oil.

The present invention is not limited to heat sealing using raised surface roller 16, but rather encompasses alternative forms of heat sealing apparati, including impulse sealing apparati, ultrasonic sealing, etc. The sealing means need not continuously seal the films together, but rather can carry out the sealing intermittently. Moreover, the raised surface roller could alternatively be a planer surface, curved surface, or portion of a clamp, as will be understood by persons familiar with film processing technology in view of the present disclosure. The raised surface roller or plate does not require a source of vacuum.

The methods of the present invention have an advantage over conventional methods of making protective laminates and bubble film because the present methods do not require thermoforming of the structure of the laminate material during the heat sealing process by vacuum stretching the films. However, the present invention is not limited to methods that do not distort, deform the films, but rather encompasses conventional vacuum stretching techniques as will be understood by persons familiar with film processing technology in view of the present disclosure.

Figure 13:
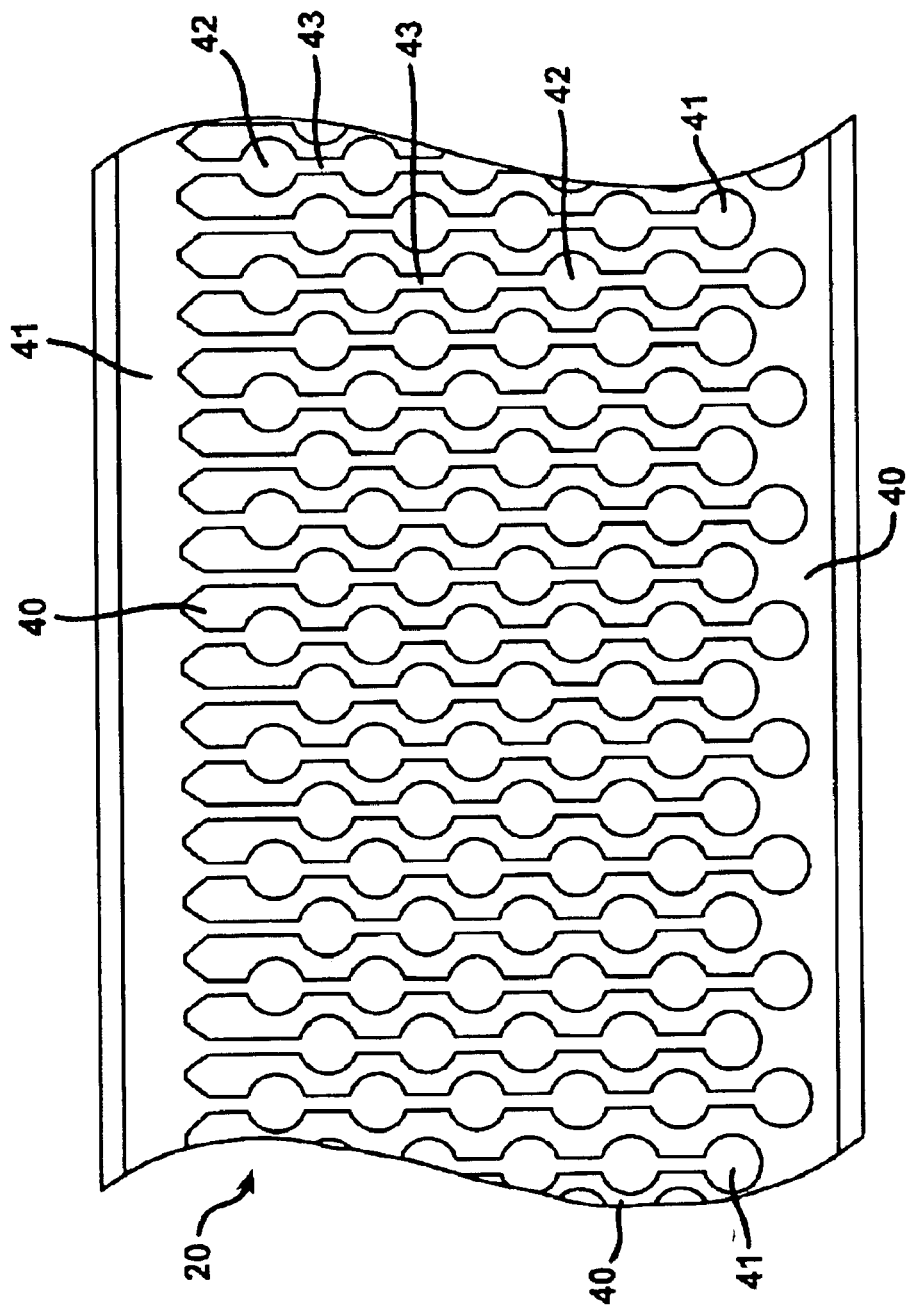
FIG. 13 is a diagrammatic view of a section of an inflatable article.

Raised surfaces 24 and recessed surfaces 26 form a patterned heat seal 27 in laminate material 20 as explained more fully below with reference to FIG. 13. Raised surfaces 24 extend away from recessed surfaces 26 thereby forming a pattern for the heat seal(s) to be made to form the inflatable article. The pattern formed by raised surface 24 is such that raised surfaces 24 are in contact with contact roller 15 when raised surface roller 16 is in contact with contact roller 15. Recess surfaces 26 are not in contact with contact surface 16 when raised surface roller 16 contacts contact roller 15.

With reference in particular to FIG. 8, in one embodiment of the present invention, raised surface roller 16 further comprises a release coating 28 that reduces adherence with film 12 while film 12 contacts raised surface roller 16, and particularly when film 12 releases from roller 16. A portion of release coating 28 is infused with one or more polymers. The polymer infused can be any conventional polymer used for reducing adherence to polymer films, for example, Teflon® polytetrafluoroethylene. Raised surface roller 16 can be infused by any conventional infusion process. Preferably, the raised surface of roller 16 is textured to reduce adherence to polymer films, as discussed in more detail below.

In an alternative embodiment of the present invention (not illustrated), contact roller 15 has raised surfaces that correspond to raised surfaces 24. Contact roller 15 has recesses and recessed surfaces that correspond with recesses 25 and recessed surfaces 26.

Referring to FIG. 7 and FIG. 8, raised surface roller 16 and contact roller 15 are operatively associate to form a nip 17. The term "nip" as used herein refers to an area between two rollers. First film 12 and second film 13 are in contact as they pass though nip 17. As first and second films 12 and 13 pass through nip 17, heat and/or pressure are applied to the films such that selected portions of first and second films 12 and 13, fusing the films together to form patterned heat seals 27.

In FIG. 9, extruders 11 and 11' are conventional extruder. First and second films 12 and 13 can be extruded as monolayer films, coextruded as multilayered films, extruded through an annular die or slot die, or extrusion coated which are familiar to persons familiar with plastic film manufacturing technology. In one embodiment first and second films 12 and 13 are toughened by crosslinking via chemical cross-linking or irradiation techniques known to those of skill in the art.

In the embodiment as shown in FIGS. 2–7, and 9 extruder 11 can be one or more extruders.

Figure 11:
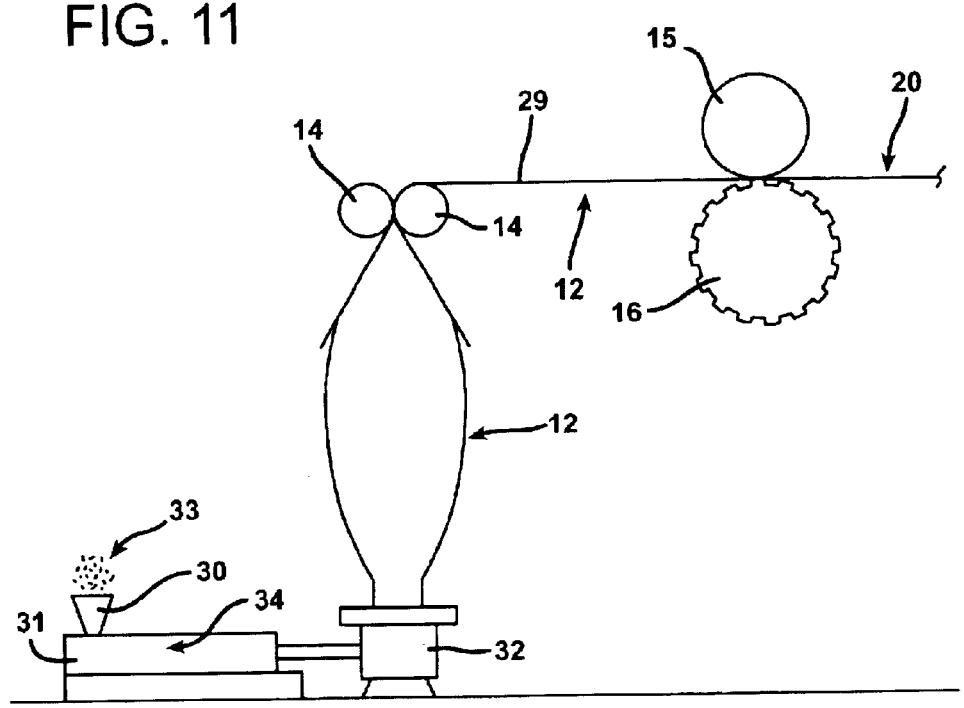
FIG. 11 is an exemplary film manufacturing apparatus using a tubular stock of film to fabricate laminate material.

In another embodiment as shown in FIG. 11, a film tubing, in lay-flat configuration, is of course integrally joined at its edges. However, the two lay-flat sides are used to form laminated inflatable article 20. In such a process, only one extruder is needed, the extruder feeding a molten stream of polymer to an annular die from which the film tubing is extruded. Optionally, a second extruder can be used to extrusion coat the tubular film with one or more film layers by extrusion coating techniques known to those skilled in the film fabrication arts.

Figure 10:
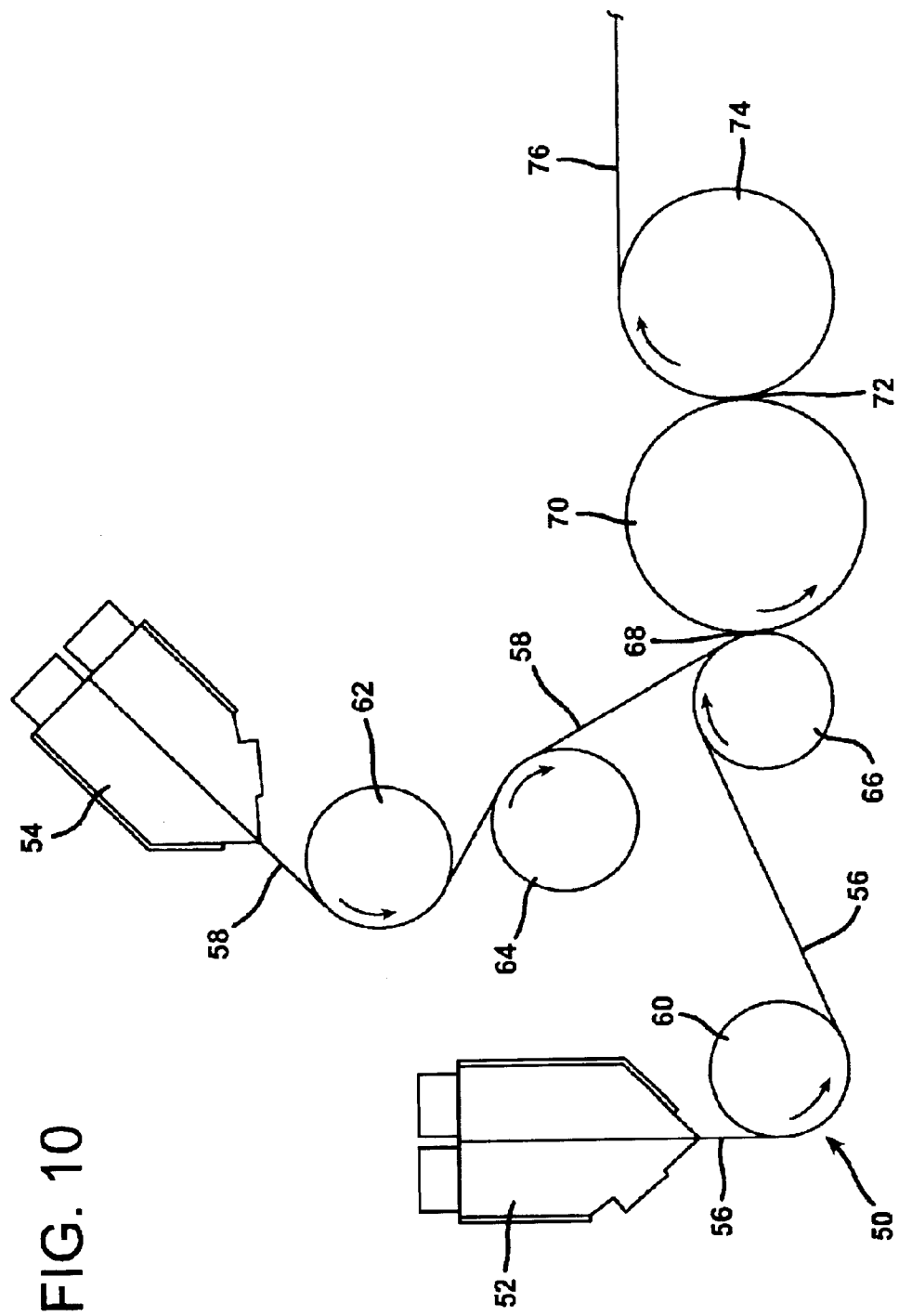
FIG. 10 is a diagrammatic view of a particularly preferred laminate manufacturing process.

FIG. 10 is a schematic of a particularly preferred apparatus and process (50) for carrying out the present invention. In FIG. 10, extruders 52 and 54 extrude first film 56 and second film 58, respectively. After extrusion, film 54 makes a partial wrap around heat transfer (cooling) roller 60, which preferably has a diameter of 8 inches and which is maintained at a surface temperature well beneath the fusion temperature of the extrudate, e.g., from 100–150° F. Second film 58 makes partial wraps around each of heat transfer (cooling) rollers 62 and 64, each of which has a diameter of 8 inches and each of which is maintained at a surface temperature similar to that of cooling roller 60. After cooling, first film 56 makes a partial wrap (about 90 degrees) around Teflon® coated rubber nip roll 66, which has a diameter of 8 inches and which has, as its primary function, maintaining nip with heat transfer (heating) raised surface roll 70. While first film 56 is passing over nip roll 66, second film 58 merges with first film 56, with both films together being wrapped for a short distance around nip roll 66 before together entering first nip 68. Nip roller 66 provides a location of films 56 and 58 to come together without being marred or distorted.

Thereafter, second film 58 makes direct contact with raised surface roll 70 (which is illustrated as a smooth roll only for simplicity of illustration). First nip 68 subjects films 56 and 58 to a pressure of from 2 to 10 pounds per linear inch, preferably 2 to 6 pounds per linear inch, more preferably about 4 pounds per linear inch.

Films 56 and 58 together contact raised surface roll 70 for a distance of about 180 degrees. Raised surface roll 70 has a diameter of 12 inches, is heated by circulating hot oil therethrough so that the surface is maintained at a temperature of from 280° F. to 350° F., and has edges of the raised surfaces being rounded over to a radius of 1/64 inch. Raised surface roll 70 has a Teflon® polytetrafluoroethylene coating thereon, with the raised surfaces being above the background by a distance of 1/4 inch (0.64 cm). Moreover, the raised surface of raised surface roll 70 is provided with a surface roughness of from 50 to 500 root mean square (i.e., "rms"), preferably 100 to 300 rms, more preferably about 250 rms. This degree of roughness improves the release qualities of raised surface roll 70, enabling faster process speeds and a high quality product which is undamaged by licking back on roll 70.

The raised surface heats that portion of film 58 which contacts the raised surface of roll 70. Heat is transferred from raised surface roll 70, through a heated portion of film 58, to heat a corresponding portion of film 56 to be heat sealed to film 58. Upon passing about 180 degrees around raised surface roll 70, heated films 58 and 56 together pass through second nip 72, which subjects heated films 58 and 56 to about the same pressure as is exerted in first nip 68, resulting in a patterned heat seal between films 56 and 58.

After passing through second nip 72, films 58 and 56, now sealed together, pass about 90 degrees around heat transfer (cooling) roller 74, which has a diameter of 12 inches and which has cooling water passing therethrough, the cooling water having a temperature of from 100° F. to 150° F. Cooling roller 74 has a ¼ inch thick (about 0.64 cm thick) release and heat-transfer coating thereon. The coating is made from a composition designated "SA-B4", which is provided and applied to a metal roller by Silicone Products and Technologies Inc of Lancaster, N.Y. The coating contains silicone rubber to provide cooling roller 74 with a Shore A hardness of from 40 to 100, preferably 50–80, more preferably 50–70, and still more preferably about 60. The SA-B4 composition also contains one or more fillers to increase the heat conductivity to improve the ability of cooling roller 74 to cool the still hot films, now sealed together to result in inflatable article 76, which is thereafter rolled up to form a roll for shipment and subsequent inflation and sealing, to result in a cushioning article.

In order to carry out the process at relatively high speed, e.g., speeds of at least 120 feet per minute, preferably from 150 to 300 feet per minute, but up to as high as 500 feet per minute, it has been found to be important to provide the manufacturing apparatus with several features. First, the raised surface roll should be provided with a release coating or layer, and to also avoid sharp edges which interfere with a clean release of the film from the raised surface roll. As used herein, the phrase "release coating" is inclusive of all release coatings and layers, including polyinfused coatings, applied coatings such as brushed and sprayed coatings which cure on the roll, and even a release tape adhered to the roll. A preferred release coating composition is Teflon® polytetrafluoroethylene. Second, the edges of the raised surfaces should be rounded off to a radius large enough that the film readily releases without snagging on an edge due to its "sharpness" relative to the softened film. Preferably, the radius of curvature is from 1/256 inch to ⅜ inch, more preferably from 1/128 inch to 1/16 inch, more preferably from 1/100 inch to 1/32 inch, and more preferably about 1/64 inch, i.e., about 0.04 cm. It is also important to provide the cooling roller downstream of and in nip relationship with the raised surface roller, with a release coating or layer, as described above.

The process and apparatus illustrated in FIG. 10 can also be supplemented with additional optional components and steps. More particularly, one or both of films 58 and 62 can be preheated to a temperature below their fusing temperature, so that less heat need be added by raised surface roller 70. In this manner, the process can be operated at higher speed, and/or the heat seal may be made stronger or of otherwise higher quality. Preheating can be carried out by, for example, providing nip roller 66 with heating characteristics in addition to providing raised surface roller 70 with heating characteristics. Optionally, additional nips can be provided against raised surface roller 70, to provide additional pressure points for the formation of strong heat seals at high manufacturing speeds.

FIG. 11 is a diagrammatic view of an exemplary film manufacturing apparatus using a tubular stock of film to fabricate laminate material. Referring to FIG. 11, extruder 34 comprises resin hopper 30, body 31, and die 32. Extruder 34 can be any conventional extruder, including for example, single screw, double screw, and/or tandem extruders. In another embodiment, one or more extruders connected to die 32 co-extrude, as multilayer film or monolayer film, polymers having different properties or compositions.

Referring to FIG. 11 to illustrate methods of extruding films, films are fabricated by providing resin pellets 33 to resin hopper 30 of extruder 34, from which resin pellets 33 are fed into extruder 34. Resin pellets 33 are melted in extruder 34 to form a molten resin stream. Optional additives can be added to the molten resin stream in a separate stream injected into extruder 34 and/or added to the extruder on or with the addition of resin pellets 33 to hopper 30. Extruder 34 forces the molten resin stream through annular die 32 to form tubular film extrudate 12 which is oriented in the machine and transverse directions while the polymer is in the molten state (and while it cools). Orientation is generated by forcing the extrudate to enlarge to pass around a blown bubble of gas (providing orientation in the transverse direction), as well as orientation generated by operating nip rolls 14 at a higher speed than the speed of the molten extrudate emerging from the annular die (providing orientation in the machine direction). The tubular extrudate 12 is collapsed into lay-flat tubing 29 after it cools to a temperature at which it will not self-weld. This process is known as a "blown" film process.

Lay-flat tubing 29 can then be converted into the inflatable article 20 in the manner illustrated in FIG. 11 and as more particularly illustrated in FIG. 8. Alternatively, lay-flat tubing 29 could also be converted into the inflatable article using the arrangement illustrated in FIG. 10, with the lay-flat tubing 29 being the sole film being passed through the first and second nips 68 and 72, respectively, instead of using two separate films as illustrated in FIG. 10.

FIGS. 6, 8, illustrate embodiments of a system that further comprises a cooling roller 18. FIG. 10 illustrates corresponding cooling roller 74. These cooling rollers are to be maintained at a temperature below the fusing temperatures of films, using conventional cooling techniques. The cooling roller solidifies the heated portions of the first and second films. The present invention is not limited to one cooling roller 18, but rather further encompasses the use of two or more cooling rollers in the process, i.e., downstream of the heated raised surface roller. Moreover, any suitable means for cooling could be used in place of one or more cooling rollers, such as cooled planer surfaces, cooled curved surfaces, cooled clamping surfaces of any shape, cool fluids and gases, etc., as will be understood by persons of skill in the art of film manufacture and processing.

The cooling roller lowers the temperature of the selected heated portions of the laminate, in order to cool the heat seals so that they become strong enough to undergo further processing without being damaged or weakened. Moreover, the cooling means is preferably immediately downstream of the heating means (i.e., the raised surface roll), in order to reduce heat seepage from the still-hot seals to unheated portions of film, to prevent unheated portions of laminated article from becoming hot enough to fuse the films in an area intended to serve as an inflation chamber or inflation passageway.

Figure 12:
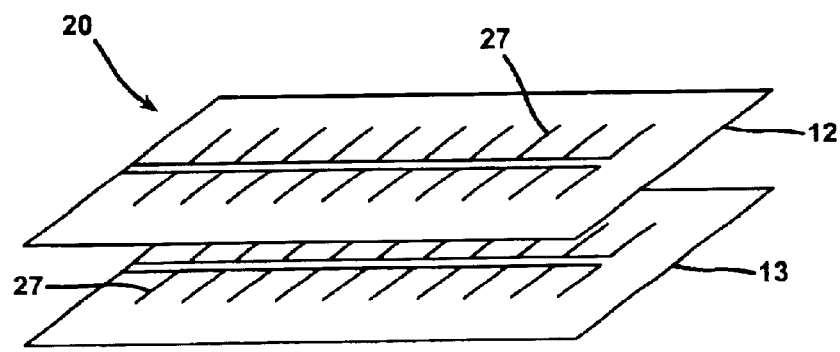
FIG. 12 is an exploded diagrammatic view of an exemplary laminate material.

FIG. 12 is an exploded diagrammatic view of an exemplary laminate material 20. FIG. 13 is a diagrammatic view of a section of a preferred laminated inflatable article produced in accordance with the present invention. Referring to FIG. 12 and FIG. 13, laminate material 20 comprises first film 12 heat sealed to second film 13 in a particular heat seal pattern. Laminate 20 has heat sealed portion 40, as well as unsealed portion 41. Heat sealed portion 40 is continuous along the machine direction of inflatable laminate article 20, with sealed portion 40 corresponding to a preferred raised surface pattern for raised surface roller 16 (FIG. 11) or 70 (FIG. 10). Unsealed portion 41 is also continuous along the machine direction of article 20, with unsealed portion 41 corresponding to a preferred recessed surface pattern (i.e., background pattern) of raised surface roller 16 and 70.

Unsealed portion 41 is arranged to form a pattern that includes distinct air chambers (42), connecting channels (43), as well as leaving a skirt (i.e., film flaps) for use in inflating the inflatable article. Optionally, the unsealed portion could further include a passageway in the machine direction which serves as a manifold, i.e. connecting each of the passageways along an edge of the article. However, a skirt is preferred.

The films referred to herein preferably comprise a polyolefin, such as for example a low density polyethylene, a homogeneous ethylene/alpha-olefin copolymer (preferably a metallocene-catalyzed ethylene/alpha-olefin copolymer), a medium density polyethylene, a high density polyethylene, a polyethylene terapthalate, polypropylene, nylon, polyvinylidene chloride (especially methyl acrylate and vinyl chloride copolymers of vinylidene chloride), polyvinyl alcohol, polyamide, or combinations thereof.

Preferably, laminate materials 20 are as thin as possible, in order to minimize the amount of resin necessary to fabricate laminate materials 20, but at the same time are thick enough to provide adequate durability. Preferably, first and second layers film 12 and 13 have a gauge thickness of from about 0.1 to about 20 mils. More preferably, each film layer has a total gauge thickness from about 0.5 to about 10 mils, more preferably from about 0.8 to about 4 mils, and even more preferably from about 1.0 to about 3 mils.

If desired or necessary, various additives are also included with the films. For example, additives comprise pigments, colorants, fillers, antioxidants, flame retardants, anti-bacterial agents, anti-static agents, stabilizers, fragrances, odor masking agents, anti-blocking agents, slip agents, and the like. Thus, the present invention encompasses employing suitable film constituents.

Preferably first and second films 12 and 13 are hot blown films having an A/B/C/B/A structure which has a total thickness of 1.5 mils. The A layers together make up 86 percent of the total thickness, each of the B layers making up 2% of the total thickness, and the C layer making up 10% of the total thickness. The C layer is an $O_2$-barrier layer of 100% Caplon® B100WP polyamide 6 having a viscosity of Fav=100, obtained from Allied Chemical. Each of the B layers are tie layers made of 100% Plexar® PX165 anhydride modified ethylene copolymer from Qunatum Chemical. Each of the A layers are a blend of 45% by weight HCX002 linear low density polyethylene having a density of 0.941 g/cc and a melt index of 4, obtained from Mobil, 45% by weight LF10218 low density polyethylene having a density of 0.918 g/cc and a melt index of 2, obtained from Nova, and 10% by weight SLX9103 metallocene-catalyzed ethylene/alpha-olefin copolymer, obtained from Exxon.

The laminates formed according to the present invention will resist popping when pressure is applied to a localized area because channels of air between chambers provide a cushioning effect. The laminates also show excellent creep resistance and cushioning properties due to inter-passage of air between bubbles.

The various terms and phrases utilized throughout this document are to be given their ordinary meaning as understood by those of skill in the art, except and to the extent that any term or phrase used herein is referred to and/or elaborated upon in U.S. Pat. No. 5,837,335, to Babrowicz, entitled High Shrink Multilayer Film which Maintains Optics upon Shrinking, issued Nov. 17, 1998, which is hereby incorporated in its entirety by reference thereto, and which supplements the ordinary meaning of all terms, phrases, and other descriptions set forth herein.

In the figures and specification, there have been disclosed preferred embodiments of the invention. All sub-ranges of all ranges disclosed are included in the invention and are hereby expressly disclosed. While specific terms are employed, they are used in a generic and descriptive sense only, and not for the purpose of limiting the scope of the invention being set forth in the following claims.

Those skilled in the art will appreciate that numerous changes and modifications may be made to the embodiments described herein, and that such changes and modifications may be made without departing from the spirit of the invention.

What is claimed is:

1. An integrated process for making an inflatable laminated article, comprising the steps of:
   (A) extruding a first flat film and a second flat film;
   (B) cooling the first flat film and the second flat film so that the first and second flat films will not fuse to one another upon contact with each other;
   (C) contacting the first flat film with the second flat film;
   (D) heating selected portions of at least one of the first and second flat films to a temperature above a fusion temperature, so that the first and second flat films are heat sealed to one another at a selected area, with the selected area providing a heat seal pattern which provides inflatable chambers between the first flat film and the second flat film, the heating being carried out by passing the first and second flat films together in a partial wrap around a heated roller having a raised surface; and
   (E) winding up or transporting the first and second flat films after they are heat sealed to one another, with the inflatable chambers uninflated.

2. The process according to claim 1, wherein the selected portions of at least one of the first and second flat films are heat sealed to one another using a combination of heat and pressure.

3. The process according to claim 1, wherein the first and second flat films are extruded simultaneously.

4. The process according to claim 1, wherein the cooling step comprises contacting at least one of the first and second flat films with at least one cooling roller.

5. The process according to claim 1, wherein the first and second flat films are extruded by separate extruders.

6. The process according to claim 1, wherein a second roller has a raised surface corresponding to the raised surface of the heated roller, and the raised surfaces of the heated roller and the second roller are operatively aligned in nip relationship, with the first flat film and the second flat film passing through the nip.

7. The process according to claim 1, wherein the heated roller has a continuous raised surface therearound.

8. The process according to claim 1, wherein the first and second flat films are heat sealed to one another in a repeating pattern of sealed and unsealed areas.

9. The process according to claim 1, wherein the heated roller having the raised surface has a release coating thereon.

10. The process according to claim 1, wherein the raised surface on the heated roller has a surface roughness of from 50 to 500 rms.

11. The process according to claim 1, further comprising cooling the first and second flat films after heating the selected portions of the flat films, the cooling being carried out by passing the first and second flat films together in a partial wrap around a cooling roller.

12. The process according to claim 11, wherein the cooling roller has a release coating thereon.

13. The process according to claim 12, wherein the release coating on the cooling roller has a Shore A hardness of from 40 to 100.

14. The process according to claim 1, wherein the first flat film and the second flat film are forwarded at a speed of at least 120 feet per minute, and the heated roller having the patterned raised surface has a release coating thereon and raised surface edges rounded off to a radius of from 1/256 inch to 3/8 inch, and further comprising a cooling roller downstream of and in nip relationship with the heated roller, the cooling roller also having a release coating thereon.

15. The process according to claim 14, wherein the first film and the second film are forwarded at a speed of from 120 to 500 feet per minute, with the patterned raised surface having a surface roughness of from 50 to 500 root mean square, and the release coating on the cooling roller having a Shore A hardness of from 40 to 100.

16. The process according to claim 1, wherein after cooling, the first flat film and the second flat film make a partial wrap around a roller which is upstream of the heated roller having the raised surface.

17. The process according to claim 16, wherein the roller which is upstream of the heated roller having the raised surface is in nip relation with the heated roller having the raised surface.

18. The process according to claim 17, wherein the second flat film is between the first flat film and the heated roller having the raised surface, and both the first flat film and the second flat film make a partial wrap around the roller in nip relation with the heated roller having the raised surface, and the first flat film makes a longer partial wrap around the roller in nip relation than does the second flat film.

19. The process according to claim 9, wherein the release coating comprises a polyinfused coating.

20. The process according to claim 19, wherein the polyinfused coating comprises polyinfused polytetrafluoroethylene.

21. The process according to claim 20, wherein the raised surface on the heated roller has a surface roughness of from 50 to 500 rms.

22. An integrated process for making an inflatable laminated article, comprising the steps of:

(A) extruding a first flat film and a second flat film;

(B) cooling the first flat film and the second flat film so that the first and second flat films will not fuse to one another upon contact with each other;

(C) contacting the first flat film with the second flat film;

(D) heating selected portions of at least one of the first and second flat films to a temperature above a fusion temperature, so that the first and second flat films are heat sealed to one another at a selected area, with the selected area providing a heat seal pattern which provides inflatable chambers between the first flat film and the second flat film, the heating being carried out by passing the first and second flat films together in a partial wrap around a heated roller having a raised surface, with the second flat film being between the first flat film and the raised surface of the heated roller, the second flat film being in direct contact with the raised surface of the heated roller, and the second flat film comprising at least one member selected from the group consisting of polyamide and polyethylene terephthalate; and (E) winding up or transporting the first and second flat films after they are heat sealed to one another, with the inflatable chambers uninflated.

23. The process according to claim 22, wherein the first flat film comprises at least one member selected from the group consisting of polyamide and polyethylene terephthalate.

24. An integrated process for making an inflatable laminated article, comprising the steps of:

(A) extruding a first flat film and a second flat film;

(B) cooling the first flat film and the second flat film so that the flat films will not fuse to one another upon contact with each other;

(C) contacting the first flat film with the second flat film while the first flat film and the second flat film are being forwarded at a speed of at least 120 feet per minute;

(D) heating selected portions of at least one of the first and second flat films by passing the first and second flat films together in a partial wrap around a heated roller having a raised surface having a release coating thereon, with the raised surface having a surface roughness of from 50 to 500 rms, and the raised surface having edges rounded off to a radius of from 1/256 inch to 3/8 inch, with the selected portions of the first and second flat films being heated to a temperature above a fusion temperature, so that the first and second flat films are heat sealed to one another at a selected area, with the selected area providing a heat seal pattern which provides inflatable chambers between the first flat film and the second flat film; and (E) cooling the first and second flat films after heating the selected portions of the flat films, the cooling being carried out by passing the first and second flat films together in a partial wrap around a cooling roller having a release coating thereon, the release coating on the cooling roller having a Shore A hardness of from 40 to 100 the cooling roller being in nip relationship with the heated roller having the raised surface; and (E) winding up or transporting the first and second flat films after they are heat sealed to one another, with the inflatable chambers uninflated.

25. The process according to claim 24, wherein the first flat film contacts the second flat film while the first and second flat films are being forwarded at a speed of from 150 to 500 feet per minute.

26. The process according to claim 24, wherein the first flat film contacts the second flat film while the first and second flat films are being forwarded at a speed of from 150 to 300 feet per minute.

27. The process according to claim 24, wherein the release coating on the heated roller having the raised surface comprises a polyinfused coating.

28. The process according to claim 27, wherein the polyinfused coating comprises polytetrafluoroethylene.

* * * * *